(12) United States Patent
Bhardwaj et al.

(10) Patent No.: US 7,688,718 B2
(45) Date of Patent: Mar. 30, 2010

(54) VARIABLE-SIZED PACKET SUPPORT FOR ENHANCED SYNCHRONOUS CONNECTION ORIENTED LINKS OVER A USB INTERFACE

(75) Inventors: Vatsal Bhardwaj, Seattle, WA (US); Egidio Sburlino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 11/291,589

(22) Filed: Nov. 30, 2005

(65) Prior Publication Data

US 2007/0121493 A1 May 31, 2007

(51) Int. Cl.
*H04J 3/14* (2006.01)
(52) U.S. Cl. ....................... 370/225; 370/346
(58) Field of Classification Search ............... 455/445, 455/520, 522; 370/346, 329, 389, 395, 401, 370/318, 225, 228, 432, 435, 351; 709/203, 709/206, 230, 226
See application file for complete search history.

(56) References Cited

U.S. PATENT DOCUMENTS

| | | | |
|---|---|---|---|
| 6,810,098 B1 | 10/2004 | Paul et al. | |
| 6,901,496 B1 | 5/2005 | Mukund et al. | |
| 6,931,009 B1 | 8/2005 | Agarwal | |
| 2002/0065045 A1 | 5/2002 | Kim | |
| 2003/0081628 A1 | 5/2003 | Sugar et al. | |
| 2004/0076156 A1 | 4/2004 | Furrer et al. | |
| 2004/0120341 A1 | 6/2004 | Hur et al. | |
| 2005/0122994 A1 | 6/2005 | Mangin et al. | |
| 2005/0135297 A1 | 6/2005 | Katayama | |
| 2006/0034253 A1* | 2/2006 | Yurugi et al. | 370/352 |
| 2007/0165678 A1* | 7/2007 | Huertgen et al. | 370/516 |

FOREIGN PATENT DOCUMENTS

WO WO2005076123 A1 8/2005

OTHER PUBLICATIONS

Sander Siezan, Symbian Ltd., "Symbian OS Version 9.1 functional description", Symbian white paper, Shortlink services, Revision v1.1, Feb. 2005.
Technotower, "VPST (Variable Packet Sizing Technology)", http://www.technotower.com/Coordinated_fp6.htm.
Sixth Framework Programme Priority 2 "Information Society Technologies", Mar. 30, 2005, http://www.ist-runes.org/docs/deliverables/D3_02.pdf.
Bluetooth Simulation Model Suite for OPNET, Submitted by Dotan Ziv, The Hebrew University, Jerusalem, Jun. 2004.
Daqing Yang et al, "Round Robin with Look Ahead: A New Scheduling Algorithm for Bluetooth", Parallel Processing Workshops, 2002. Proceedings.

(Continued)

*Primary Examiner*—Sam Bhattacharya (57) ABSTRACT

A system for enabling data packets of variable size to be used on Bluetooth communication links over Universal Serial Bus (USB) is provided. A host device is configured to identify a target device with Bluetooth capabilities. The host device may determine a USB alternate setting for Bluetooth communication having data packets of variable sizes and establish a Bluetooth connection link with the target device having the determined USB alternate setting. Data packets are provided to the target device with variable sizes up to a maximum size associated with the alternate setting. In one implementation, the USB alternate setting is a new setting that is added to an existing Bluetooth SIG specification.

20 Claims, 8 Drawing Sheets

OTHER PUBLICATIONS

Bluetooth™ Simulation Model Suite for OPNET, Perfomance analysis for personal area networks and ISM-based coexistence, 2001, http://www.highsys.com/products/Suitetooth.pdf.

S. Avancha et al, "Transport Protocols in Wireless Networks", University if Maryland Baltimore County, http://ebiquity.umbc.edu/_file_directory_/papers/52.pdf.

* cited by examiner

| Interface Number | Alternate Setting | Endpoint Address | Endpoint Type | Packet Size |
|---|---|---|---|---|
| HCI Commands | | | | |
| 0 | 0 | 0x00 | Control | 8/16/32/64 |
| HCI Events | | | | |
| 0 | 0 | 0x81 | Interrupt (IN) | 16 |
| ACL Data | | | | |
| 0 | 0 | 0x82 | Bulk (IN) | 32/64 |
| 0 | 0 | 0x02 | Bulk (OUT) | 32/64 |
| No active voice channel (for USB compliance) | | | | |
| 1 | 0 | 0x83 | Isoch (IN) | 0 |
| 1 | 0 | 0x03 | Isoch (OUT) | 0 |
| One voice channel with 8-bit encoding | | | | |
| 1 | 1 | 0x83 | Isoch (IN) | 9 |
| 1 | 1 | 0x03 | Isoch (OUT) | 9 |
| Two voice channels with 8-bit encoding or one voice channel with 16-bit encoding | | | | |
| 1 | 2 | 0x83 | Isoch (IN) | 17 |
| 1 | 2 | 0x03 | Isoch (OUT) | 17 |
| Three voice channels with 8-bit encoding | | | | |
| 1 | 3 | 0x83 | Isoch (IN) | 25 |
| 1 | 3 | 0x03 | Isoch (OUT) | 25 |
| Two voice channels with 16-bit encoding | | | | |
| 1 | 4 | 0x83 | Isoch (IN) | 33 |
| 1 | 4 | 0x03 | Isoch (OUT) | 33 |
| Three voice channels with 16-bit encoding | | | | |
| 1 | 5 | 0x83 | Isoch (IN) | 49 |
| 1 | 5 | 0x03 | Isoch (OUT) | 49 |

FIG. 3

| Interface Number | Alternate Setting | Suggested Endpoint Address | Endpoint Type | Suggested Max Packet Size |
|---|---|---|---|---|
| 1 | 6 | 0x83 | Isoch (IN) | 86 |
| 1 | 6 | 0x83 | Isoch (OUT) | 86 |

FIG. 4

| Interface Number | Alternate Setting | Suggested Endpoint Address | Endpoint Type | Suggested Max Packet Size |
|---|---|---|---|---|
| 1 | 6 | 0x83 | Isoch (IN) | 258 |
| 1 | 6 | 0x83 | Isoch (OUT) | 258 |

VARIABLE-SIZED PACKET SUPPORT FOR ENHANCED SYNCHRONOUS CONNECTION ORIENTED LINKS OVER A USB INTERFACE

BACKGROUND

Bluetooth supports both synchronous and asynchronous services. For these services, conventional Bluetooth devices provide two different types of physical links: namely Synchronous Connection Oriented (SCO) links and Asynchronous Connectionless Links (ACLs). These two types of links are capable of handling many different device types and usage. Currently, SCO and ACL links do not have the necessary capabilities to handle many types of real-time, high bit rate communications, such as media data.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example enables data packets of variable size to be used on Bluetooth communication links over Universal Serial Bus (USB). A host device is configured to identify a target device with Bluetooth capabilities. The host device may determine a USB alternate setting for Bluetooth communication having data packets of variable sizes and establish a Bluetooth connection link with the target device having the determined USB alternate setting. Data packets are provided to the target device with variable sizes up to a maximum size associated with the alternate setting. In one implementation, the USB alternate setting is a new setting that is added to an existing Bluetooth SIG specification.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for transmitting variable-size data packets with Bluetooth enhanced synchronous oriented links over USB, the system described is provided as an example and not a limitation. As those skilled in the art will appreciate, the present examples are suitable for application in a variety of different types of systems for transmitting variable-sized data packets using Bluetooth.

Figure 1:
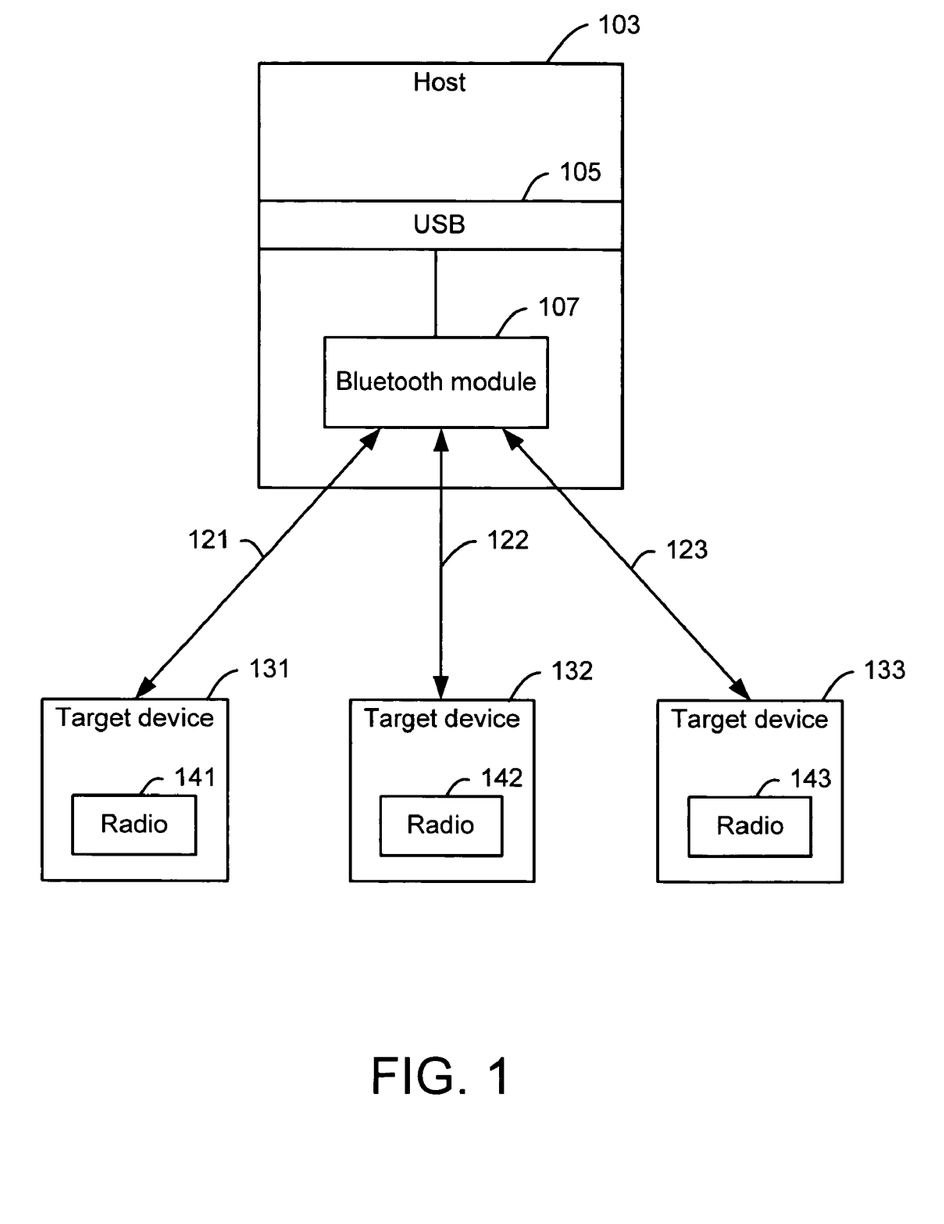
FIG. 1 shows an example Bluetooth communication system.

FIG. 1 shows an example Bluetooth communication system 100. Host 103 is a computing device capable of communicating with other devices using Bluetooth. Host 103 includes a Bluetooth module 107 configured to handle communications with target devices 131-133. Host 103 in example system 100 is configured such that Bluetooth module 107 is connected to other logical and physical components within in host 103 (e.g. see FIG. 8) through bus 105 corresponding to Universal Serial Bus (USB). Other configurations for a Bluetooth module to communicate with other components in host 103 may also be implemented.

Host 103 may establish connections with Bluetooth capable devices through Bluetooth module 107. As shown in FIG. 1, Bluetooth module 107 may establish connections with target devices 131-133. Typically, Bluetooth connections are established ad hoc. Two or more Bluetooth devices sharing the same channel form a piconet. In a piconet, one device acts as a master device while the other devices act as slave devices for the duration of the piconet. Target devices 131-133 include radios 141-143 to transmit data signals to and receive data signals from the radio in Bluetooth module 107. The data signals are typically encoded as data packets with formats that correspond to a specification associated with Bluetooth, such as Bluetooth Special Interest Group (SIG) specification. In this example, the specification enables both synchronous and asynchronous connection links. Example communication links for Bluetooth over USB will be discussed below in conjunction with FIG. 2.

In operation, Bluetooth module 107 is configured to communicate with target devices 131-133 to set the type of the connection link before data packets associated with that link are sent. In particular, Bluetooth module 107 is configure to specify the properties of the data packets transmitted over the communication link. In one example implementation, a USB alternate setting in accordance with a Bluetooth SIG specification is used to specify the data packet properties for Bluetooth links over USB. A new USB alternate setting is incorporated in the specification and is associated with a maximum data packet size that can include time-bounded data with a high bit rate. Host and target devices 131-133 are configured to send data packets of any size up to the maximum size.

Figure 2:
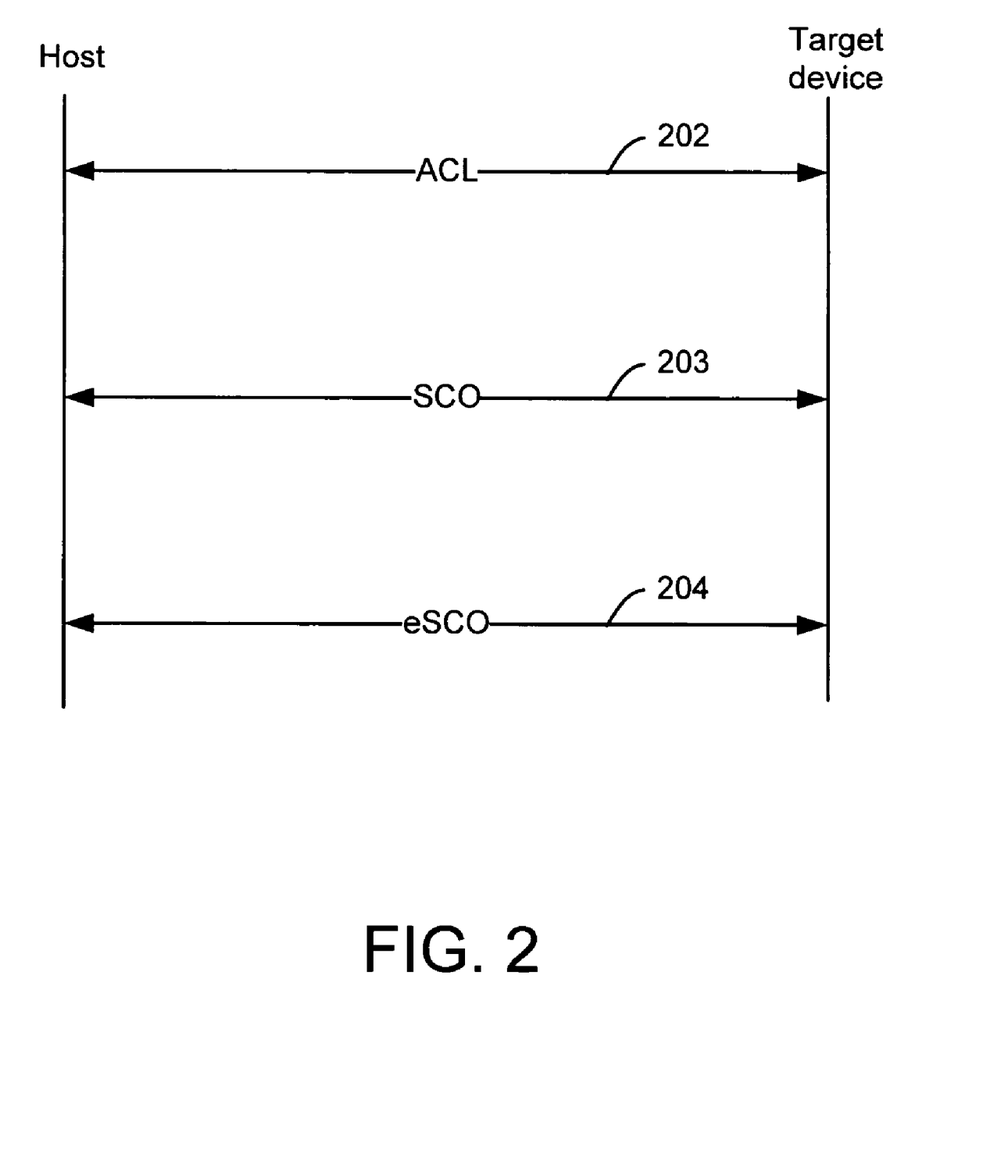
FIG. 2 shows example communication links that may be established between a host and a target device.

FIG. 2 shows example communication links 200 that may be established between a host and a target device. As shown in FIG. 2, communication links 200 may include Asynchronous Connectionless Link (ACL) 202, Synchronous Connection Oriented (SCO) link 203 and Enhanced SCO (eSCO) link 204. Bluetooth supports both synchronous and asynchronous services. ACL 202 is a packet-switched data link defined for the Bluetooth systems and is an asynchronous connection between the master and all the slaves participating in the piconet. ACL 202 is used primarily to transmit ACL packet data. However, ACL 202 is not time dependent and is unsuitable for providing time-bounded data, such as voice data.

SCO link 203 is configured for communicating synchronized information. SCO link 203 is typically configured as a symmetric, point to point link between the host (e.g. master) and the slave (e.g. target device) in the piconet. SCO link 203 may be used where latency is more important than data integrity. Particularly, SCO link 203 is suitable for time-bounded information like voice communications. SCO data packets are time-bounded and are typically not retransmitted. A SCO link may be set up by a Link Manager (LM) command from the master to the slave. This message may contain timing parameters, which specify SCO timing interval and starting offset.

eSCO links 204 is also configured for communicating synchronized information. eSCO link 204 has a number of enhancements over SCO link 203. For example, eSCO link 204 provides some retransmission capabilities and, thus, can improve data transmission performance in noisy environments. eSCO link 204 also allows the devices to choose a custom audio codec. Furthermore, eSCO enables packet types that allow the two devices to communicate at a higher bandwidth. Available data packet types for Bluetooth links over USB are associated with USB alternate settings specified by a conventional Bluetooth SIG specification. eSCO settings are communicated between the master and slave Bluetooth devices so that the devices understand the process for creating and parsing data packets. In one example implementation, the actual alternative settings are implicit based on the type and number of SCO or eSCO links. For example if one SCO 8-bit, use Interface Number=1, Alternative Setting=1; if three SCO 16-bit, use Interface Number=1, Alternative Setting=5; if eSCO, use new proposed Alternative Setting. Conventional USB alternate settings and the associated data packet types as specified by the existing Bluetooth specification are typically sufficient for communicating data for SCO links over USB. However, these conventional alternative settings are not sufficient to provide eSCO data packets for eSCO links when eSCO data packets are different from the existing eSCO packets are allowed under the existing Bluetooth specification. Conventional USB alternate settings will be discussed in conjunction with FIG. 3. Two examples of eSCO capable USB alternate settings will be discussed in conjunction with FIG. 4-5.

Figure 3:
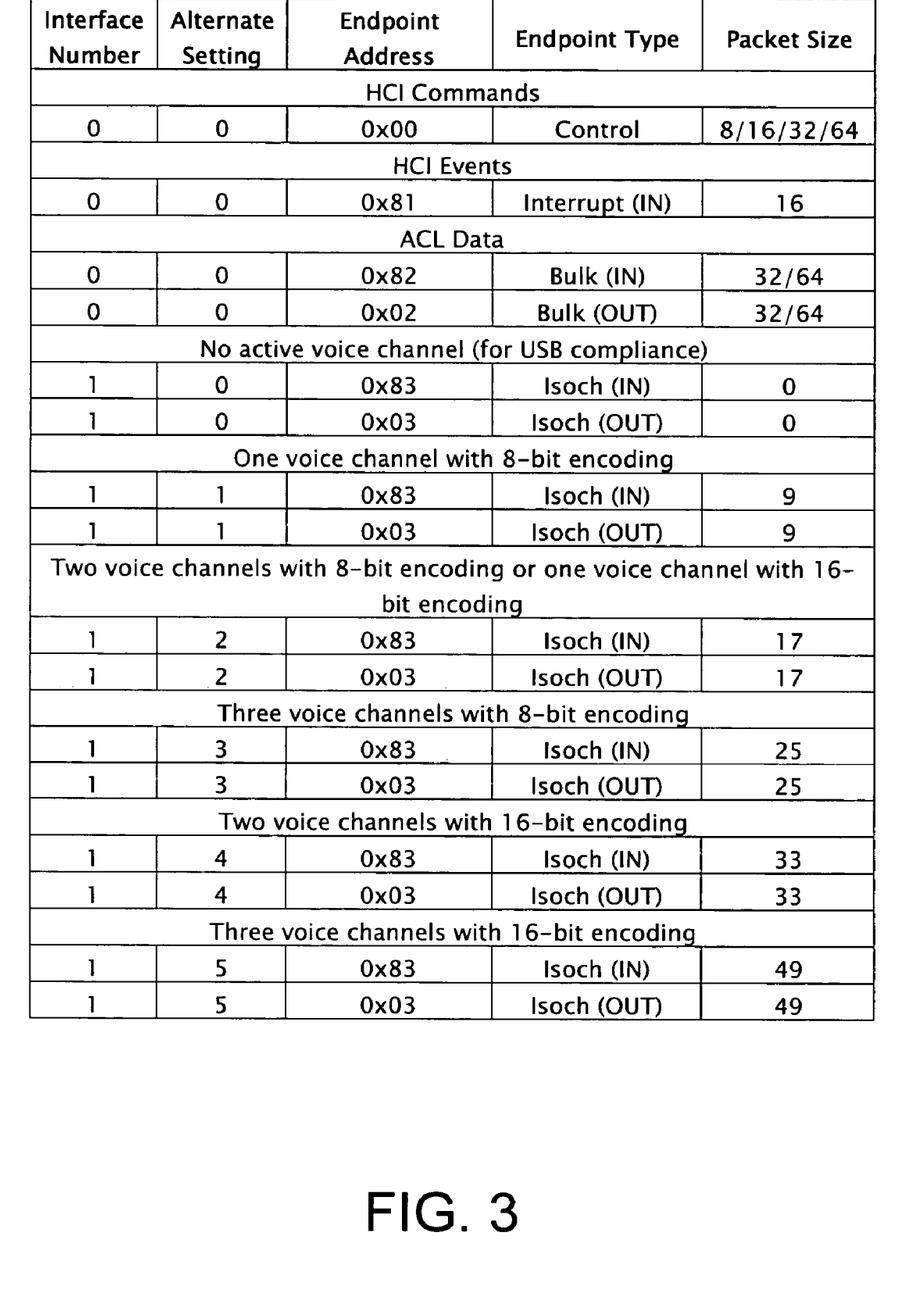
FIG. 3 shows an example data packet specification for Bluetooth communication links.

FIG. 3 shows an example data packet specification 300 for Bluetooth communication links. Example specification 300 specifies the properties of data packets that can be communicated between a host and a target device using a Bluetooth device connected through USB. In FIG. 3, example specification 300 is associated with Bluetooth Specification Version 1.1.

Data packets for various communication types are included in specification 300. In particular, specification 300 specifies the data packets for Host Controller Interface (HCI) commands and events. These data packets are mainly used by the host to send administrative data related to the connection to the target device and typically do not contain the substantive data that are to be communicated.

Specification 300 also specifies the properties of data packets communicated through an ACL. In specification 300, data packets for ACL have a maximum USB data packet size of either 32 bytes or 64 bytes. As described above, ACL is not suitable for time-bounded data.

For time-bounded data, example specification 300 supports several types of USB data packet types suitable for SCO links. Each type of time-bounded data packets is associated with a particular USB alternate setting. As shown in FIG. 3, a USB alternate setting of 1 enables USB data packets for one voice channel with an 8-bit encoding. The data packets are isochronous and have a USB packet size of 9 bytes. For two voice channels with 8-bit encoding or one voice channel with 16-bit encoding, a USB alternate setting of 2 may be used. This setting enables USB data packets with 17 bytes. For three channels voice channels with 8-bit encoding, a USB alternate setting of 3 may be used and the USB setting allows USB data packets of 25 bytes. A USB alternate setting of 4 may be used for two voice channels with 16-bit encoding having data packets of 33 bytes. For three voice channels, a USB alternate setting of 5 may be used for USB data packets of 49 bytes.

The data packets specified by specification 300 are suitable for SCO links with relatively low bit rate voice communication. However, the described USB alternate settings typically do not provide data packets that are suitable for carrying information for eSCO links, which do not have packet size limitations of transfer rates or bit rates. Typically, data for eSCO links can include enhanced quality audio, music, video, and other media data.

Figure 4:
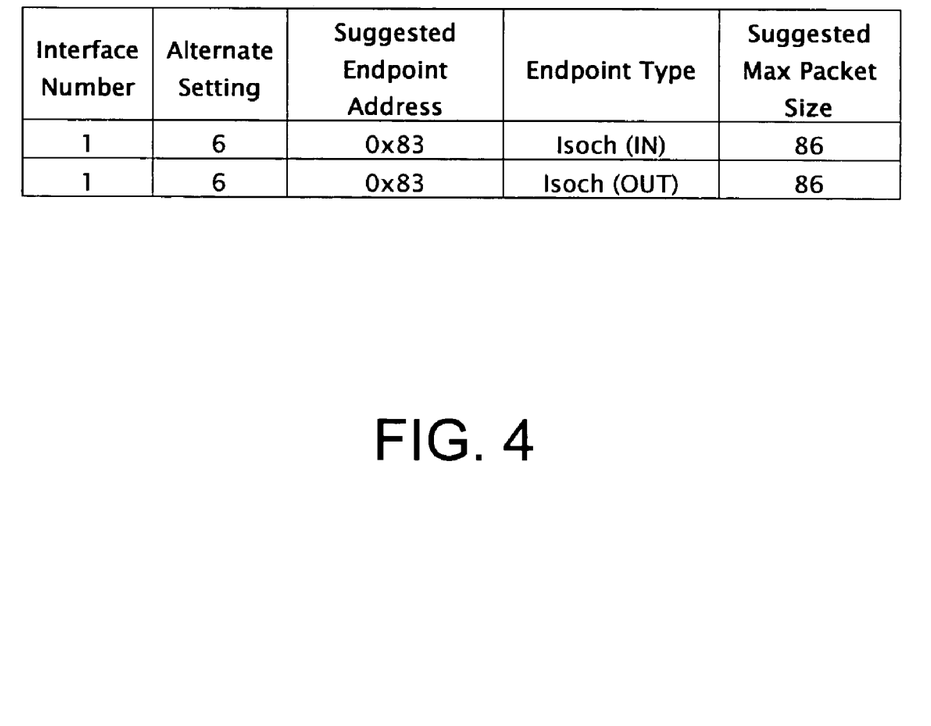
FIG. 4 shows an example data packet type that may be incorporated into the Bluetooth data packet specification shown in FIG. 3.

FIG. 4 shows an example data packet type 400 that may be incorporated in specification 300 shown in FIG. 3. In this example, data packet type 400 in FIG. 4 corresponds to alternate setting 6. The maximum packet size for data packet type 400 is 86 bytes. In one example implementation, the host may specify alternate setting 6 and provide data packet with a maximum packet size of 86 bytes. For example, with 86 bytes per USB packet, one eSCO link of 680 Kbytes/sec can be supported when sending a single SCO packet in 3 USB packets ((255 max data+3 header)/3=86).

Figure 5:
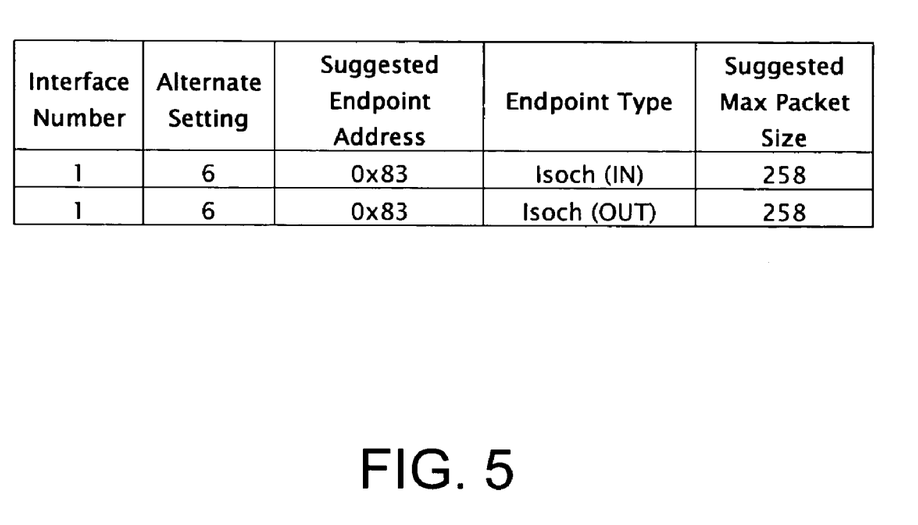
FIG. 5 shows another example data packet type that may be incorporated in specification shown in FIG. 3.

FIG. 5 shows another example data packet type 500 that may be incorporated into the Bluetooth data packet specification 300 shown in FIG. 3. Data packet type 500 corresponds to USB alternate setting 6, which is a new setting in specification 300. Data packet type 500 may be used for devices that are capable of supporting enhanced data rate. As shown in FIG. 5, data packet type 500 includes a maximum packet size of 258 bytes. The size allowed by data packet type 500 enables a host and a target device to support 2 or more eSCO channels of 680 Kbytes/sec. In one example implementation, this USB packet size allows 3 eSCO channels of 680 Kbytes/sec when sending a single SCO packet in a USB packet. It is to be appreciated that the example data packet type 500 is an option for enhanced data rate. If support for multiple eSCO channels of high bandwidth are not needed, data packet type 500 does not have to be implemented. In another example implementation, a SCO data packet may be sent in one USB data packet (normally the SCO data packet is sent every three USB data packets).

Data packet type 500 also enables a Bluetooth device to use different data packet sizes, up to the maximum size. In this manner, the device can efficiently transmit data without being constrained by a fixed data packet size. It is to be appreciated that data packet type 500 in the example shown in FIG. 5 corresponds to a new USB alternate setting in specification 300. In another example, data packet type 500 may be associated with a USB alternate setting that is a modification of an existing setting in specification 300.

Figure 6:
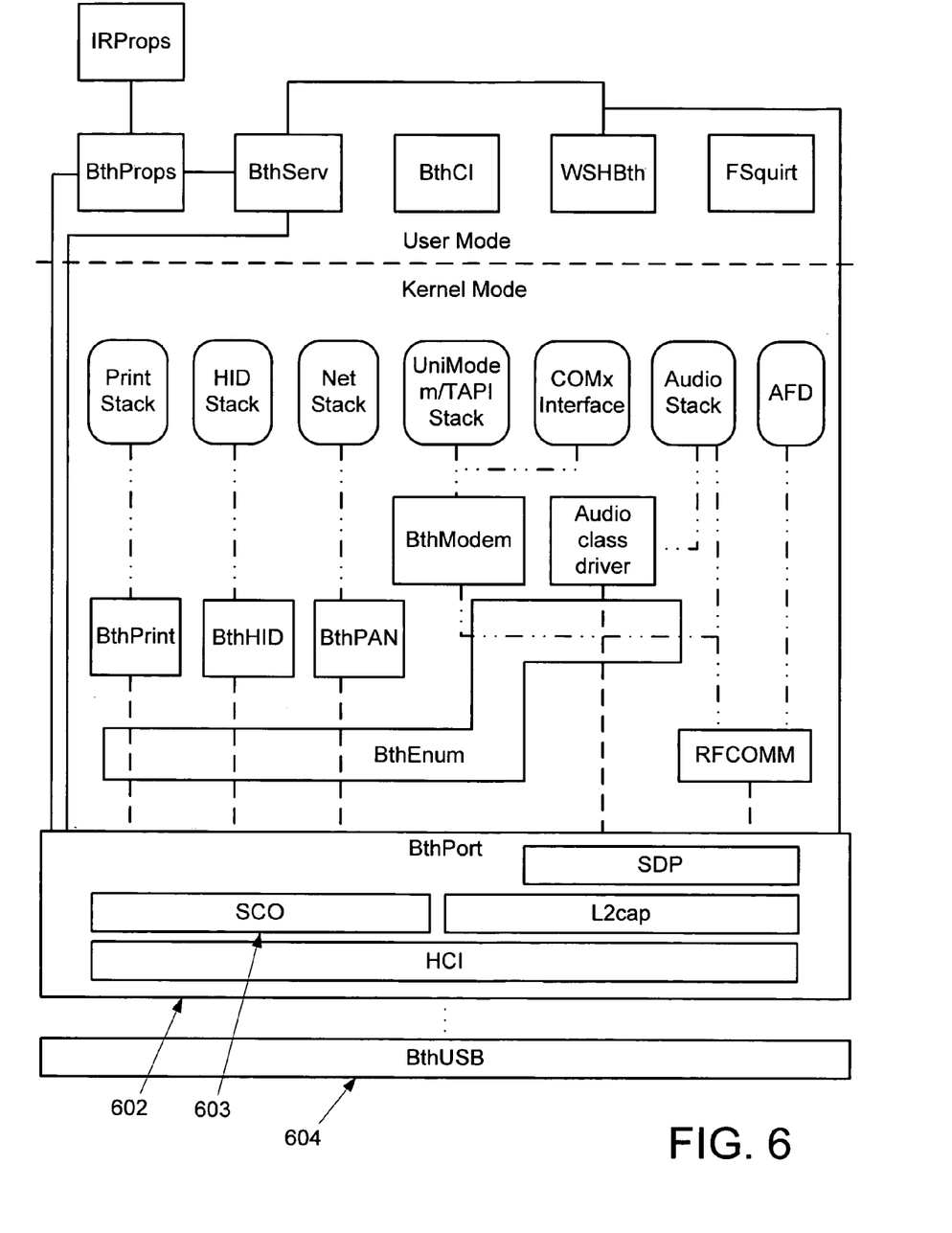
FIG. 6 shows an example Bluetooth stack associated with an operating system.

FIG. 6 shows an example Bluetooth stack associated with an operating system. As shown in the FIG. 6, components in both user mode and kernel mode are extended through Bluetooth port module 602. For time-bounded data, Bluetooth port module 602 includes a SCO module 603 for establishing a SCO link and processing data packets associated with the link. SCO module 603 is configured to establish both SCO and eSCO links. Bluetooth port module 602 is configured to interact with Bluetooth USB module 604 for communicating data through a bus corresponding to USB.

Figure 7:
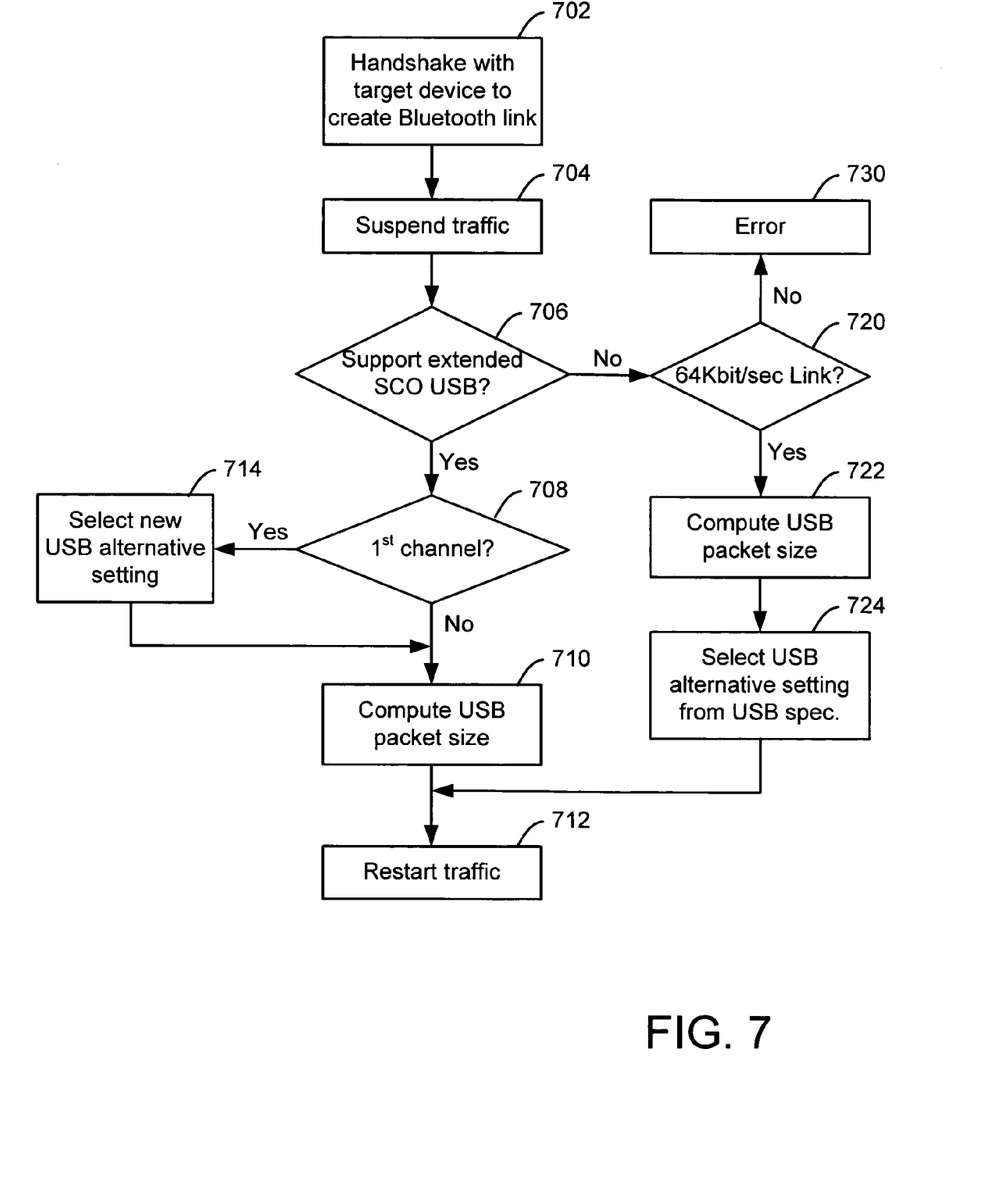
FIG. 7 shows an example process for establishing a data link with a Bluetooth device for time-bounded data.

FIG. 7 shows an example process 700 for establishing a data link with a Bluetooth device for time-bounded data. Process 700 may be used by a host (e.g. master) to establish an eSCO link with a target device (e.g. slave). At block 702, a handshake is established with the target device to create a Bluetooth link, which can be a SCO or an eSCO link. At block 704, the data traffic is suspended. At decision block 706, a determination is made whether extended SCO USB is supported. If so, process 700 moves to decision block 706 where a determination is made whether the channel to be established is the first channel. If so, the process goes to block 714 where a new USB alternative setting is selected. Process 700 continues at block 710 where the USB packet size is computed. At block 712, the data traffic is restarted.

Returning to decision block 706, if extended SCO USB is not supported, process 700 goes to decision block 720 where a determination is made whether 64 Kbit/sec link is supported. If not, process 700 returns an error at block 730. If so, process 700 continues at block 722 where the USB packet size is computed. At block 724, the USB alternative setting is selected from the USB specification. The process then continues at block 712.

Figure 8:
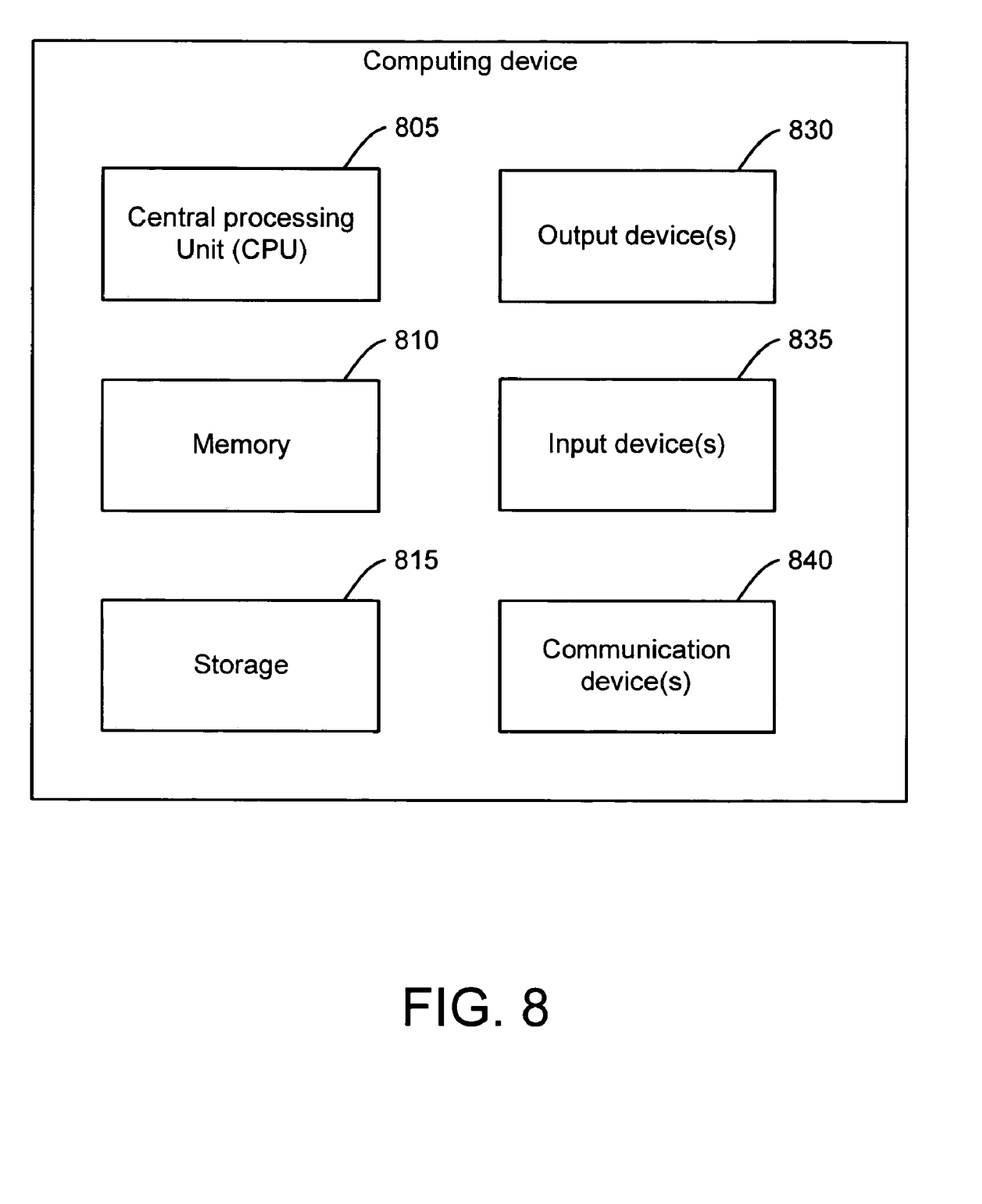
FIG. 8 shows an exemplary computer device for implementing the described systems and methods.

FIG. 8 shows an exemplary computer device 800 for implementing the described systems and methods. In its most basic configuration, computing device 800 typically includes at least one central processing unit (CPU) 805 and memory 810.

Depending on the exact configuration and type of computing device, memory 810 may be volatile (such as RAM), non-volatile (such as ROM, flash memory, etc.) or some combination of the two. Additionally, computing device 800 may also have additional features/functionality. For example, computing device 800 may include multiple CPU's. The described methods may be executed in any manner by any processing unit in computing device 800. For example, the described process may be executed by both multiple CPU's in parallel.

Computing device 800 may also include additional storage (removable and/or non-removable) including, but not limited to, magnetic or optical disks or tape. Such additional storage is illustrated in FIG. 8 by storage 815. Computer storage media includes volatile and nonvolatile, removable and non-removable media implemented in any method or technology for storage of information such as computer readable instructions, data structures, program modules or other data. Memory 810 and storage 815 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications device(s) 840 that allow the device to communicate with other devices. Communications device(s) 840 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 800 may also have input device(s) 835 such as keyboard, mouse, pen, voice input device, touch input device, etc. Output device(s) 830 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more device-readable media encoded with device-executable instructions for performing steps comprising:
   identifying a target device with Bluetooth capabilities;
   determining a Universal Serial Bus (USB) alternate setting for Bluetooth communication having data packets of variable sizes;
   establishing a Bluetooth connection link with the target device having the determined USB alternate setting; and
   providing to the target device a data packet with a size up to a maximum size associated with the alternate setting.

2. The one or more device-readable media as recited in claim 1, wherein the Bluetooth connection link is an Enhanced Synchronous Connection Orientated (eSCO) link.

3. The one or more device-readable media as recited in claim 1, wherein the USB alternate setting is associated with a Bluetooth Special Interest Group (SIG) Specification.

4. The one or more device-readable media as recited in claim 3, wherein the Bluetooth Special Interest Group (SIG) Specification is Version 1.1.

5. The one or more device-readable media as recited in claim 3, wherein the USB alternate setting is a new setting for eSCO communication in the Bluetooth SIG Specification 1.1.

6. The one or more device-readable media as recited in claim 3, wherein the USB alternate setting is a modification of a previous setting in the Bluetooth SIG Specification 1.1.

7. The one or more device-readable media as recited in claim 1, wherein the data packet contains time-bounded data.

8. The one or more device-readable media as recited in claim 7, further comprising determining the USB alternate setting and identifying the maximum packet size based, at least in part, on a handshake with the target device.

9. The one or more device-readable media as recited in claim 7, further comprising sending a SCO data packet in one USB data packet.

10. A computing device comprising a Bluetooth module connected through a bus associated with USB, the Bluetooth module configured to determine a USB alternate setting associated with communicating data packets of variable sizes and to establish a Bluetooth connection link with a target device having the determined setting, the module further configured to provide a data packet to the target device with a size up to a maximum size associated with the alternate setting.

11. The computing device as recited in claim 10, wherein the Bluetooth module is further configured to set the maximum size based, at least in part, on a handshake with the target device.

12. The computing device as recited in claim 11, wherein the Bluetooth module is further configured to set the maximum size to 258 bytes if the target device is capable of handling enhanced data rate.

13. The computing device as recited in claim 10, wherein the Bluetooth module is further configured determine the USB alternate setting based, at least in part, on whether the target device is capable of handling enhanced data rate.

14. The computing device as recited in claim 9, wherein the determined USB alternate setting is associated with a Bluetooth SIG Specification.

15. The computing device as recited in claim 10, wherein the Bluetooth SIG Specification is Version 1.1.

16. The computing device as recited in claim 15, wherein the USB alternate setting is a new setting 6 in the Bluetooth SIG Specification Version 1.1.

17. The computing device as recited in claim 15, wherein the USB alternate setting is a modification of a previous setting in the Bluetooth SIG Specification Version 1.1.

18. A system for a host to communication with a target device using a Bluetooth connection over USB comprising:
    means for identifying a USB alternate setting that specifies data packets capable of transmitting time-bounded media data;
    means for establishing a Bluetooth eSCO connection with the target device;
    means for determining a maximum packet size associated with the USB alternate setting; and
    means for transmitting media data with data packets with variable sizes up to the determined maximum packet size.

19. The system as recited in claim 18, further comprising means for adding the determined USB alternate setting as a new setting in accordance with a Bluetooth SIG Specification.

20. The system as recited in claim 18, further comprising means for sending a SCO data packet in one USB data packet.

* * * * *